United States Patent
Taylor

(10) Patent No.: US 11,040,788 B2
(45) Date of Patent: Jun. 22, 2021

(54) FORMER SHOULDER

(71) Applicant: TNA Australia Pty Limited, Lidcombe (AU)

(72) Inventor: Alfred Alexander Taylor, Lugarno (AU)

(73) Assignee: TNA Australia Pty Limited, Lidcombe (AU)

( * ) Notice: Subject to any disclaimer, the term of this patent is extended or adjusted under 35 U.S.C. 154(b) by 889 days.

(21) Appl. No.: 13/692,937

(22) Filed: Dec. 3, 2012

(65) Prior Publication Data

US 2013/0165305 A1    Jun. 27, 2013

(30) Foreign Application Priority Data

Dec. 5, 2011 (AU) .................. 2011905057

(51) Int. Cl.
*B65B 9/22* (2006.01)
*B29C 65/18* (2006.01)
(Continued)

(52) U.S. Cl.
CPC .............. *B65B 9/22* (2013.01); *B29C 65/18* (2013.01); *B29C 65/787* (2013.01); *B29C 65/7847* (2013.01); *B29C 65/7894* (2013.01); *B29C 66/0242* (2013.01); *B29C 66/1122* (2013.01); *B29C 66/4322* (2013.01); *B29C 66/49* (2013.01); *B29C 66/8161* (2013.01);
(Continued)

(58) Field of Classification Search
CPC .......... B31B 1/00; B29C 65/00; B29C 65/18; B29C 66/0242; B29C 66/1122; B29C 66/4322; B29C 66/49; B29C 65/7847; B29C 65/7894; B29C 65/787; B29C 66/8161; B29C 66/849; B29C 66/81463; B29C 66/836; H05B 3/56; H05B 3/565; B65B 9/22; B65B 9/207; B65B 9/213; B65B 9/20; B65B 9/2021; B65B 51/26

USPC ....... 493/269, 274, 287, 151, 186, 189, 191, 493/197, 202; 55/551; 53/141

See application file for complete search history.

(56) References Cited

U.S. PATENT DOCUMENTS 2,982,932 A * 5/1961 Morey ................. H05B 3/56
219/528
3,122,072 A * 2/1964 Monsees et al. ............ 493/468
(Continued)

FOREIGN PATENT DOCUMENTS

EP    2 063 237 A1    5/2009
GB    2409847 A    7/2005
(Continued)

OTHER PUBLICATIONS

Search Report from Spanish Application No. 201231904 dated Dec. 5, 2012 (4 pages).

*Primary Examiner* — Thomas M Wittenschlaeger
(74) *Attorney, Agent, or Firm* — Kilpatrick Townsend & Stockton LLP

(57) ABSTRACT

A former assembly (10) including a base (11) to which there is attached a frame (12) that supports a sleeve (13). The sleeve (13) encloses a generally upwardly extending passage (14) to which product is delivered in batches from a weighing machine. Fixed to the internal surface (20) of the former shoulder (15) are heaters (24) that heat the external surface (16) over which the film bag material passes to be heated thereby.

15 Claims, 2 Drawing Sheets

(51) Int. Cl.
  *B29C 65/78* (2006.01)
  *B29C 65/00* (2006.01)
  *B65B 51/26* (2006.01)
  *B65B 9/20* (2012.01)

(52) U.S. Cl.
  CPC ...... *B29C 66/81463* (2013.01); *B29C 66/836* (2013.01); *B29C 66/849* (2013.01); *B65B 9/2021* (2013.01); *B65B 51/26* (2013.01)

(56) References Cited

U.S. PATENT DOCUMENTS

| | | | |
|---|---|---|---|
| 3,195,428 A | | 7/1965 | Tuma |
| 3,415,171 A | * | 12/1968 | Wilson .......................... 493/302 |
| 3,494,265 A | * | 2/1970 | Middour ........................ 493/468 |
| 3,636,826 A | * | 1/1972 | Bowen et al. ................. 493/417 |
| 3,779,836 A | * | 12/1973 | Henry et al. ................... 156/466 |
| 4,663,917 A | | 5/1987 | Taylor et al. |
| 4,753,336 A | | 6/1988 | Taylor et al. |
| 4,910,943 A | | 3/1990 | Taylor et al. |
| 5,622,032 A | | 4/1997 | Ryan |
| 6,655,110 B2 | | 12/2003 | Taylor |
| 7,114,307 B2 | * | 10/2006 | Tada ....................... B29C 65/18 493/193 |
| 7,124,559 B2 | | 10/2006 | Taylor |
| 7,152,387 B2 | | 12/2006 | Taylor |
| 7,159,376 B2 | | 1/2007 | Taylor |
| 7,383,672 B2 | | 6/2008 | Taylor et al. |
| 7,415,809 B2 | | 8/2008 | Taylor |
| 7,472,528 B2 | | 1/2009 | Taylor |
| 7,600,630 B2 | | 10/2009 | Taylor et al. |
| 2006/0163240 A1 | * | 7/2006 | Xiao ......................... A61L 9/03 219/438 |

FOREIGN PATENT DOCUMENTS

| | | |
|---|---|---|
| JP | S48-51779 A | 7/1973 |
| JP | S59-26408 A | 2/1984 |
| JP | H10-194218 A | 7/1998 |
| JP | 2002-104310 A | 4/2002 |
| JP | 2005-193985 A | 7/2005 |

* cited by examiner

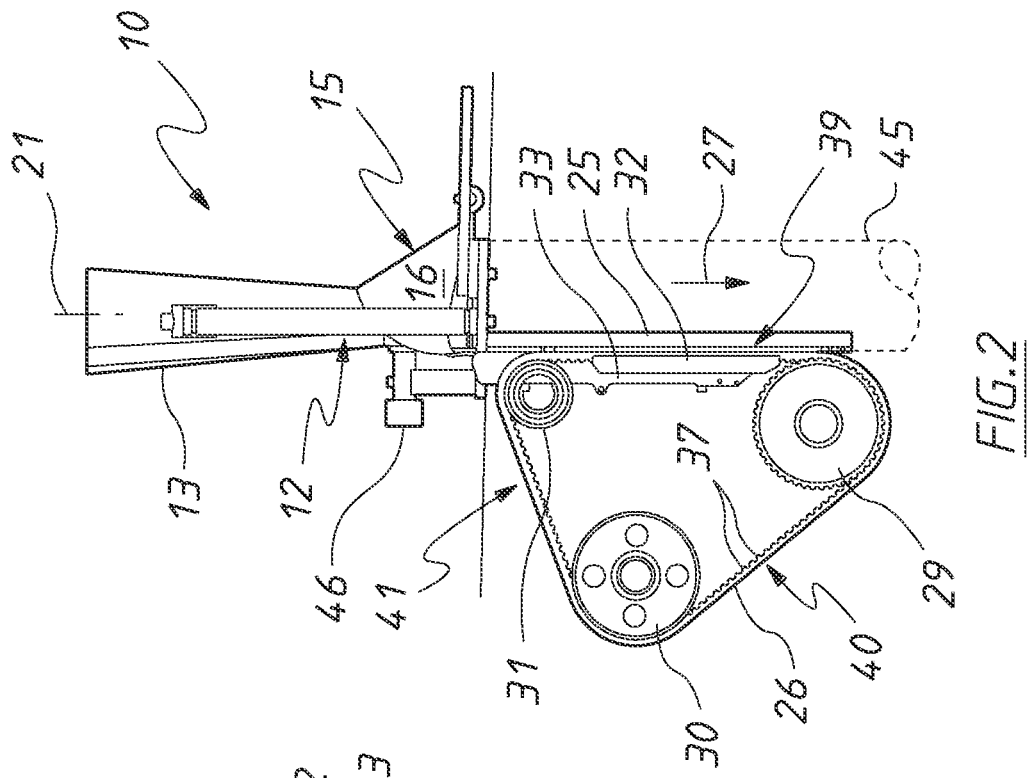
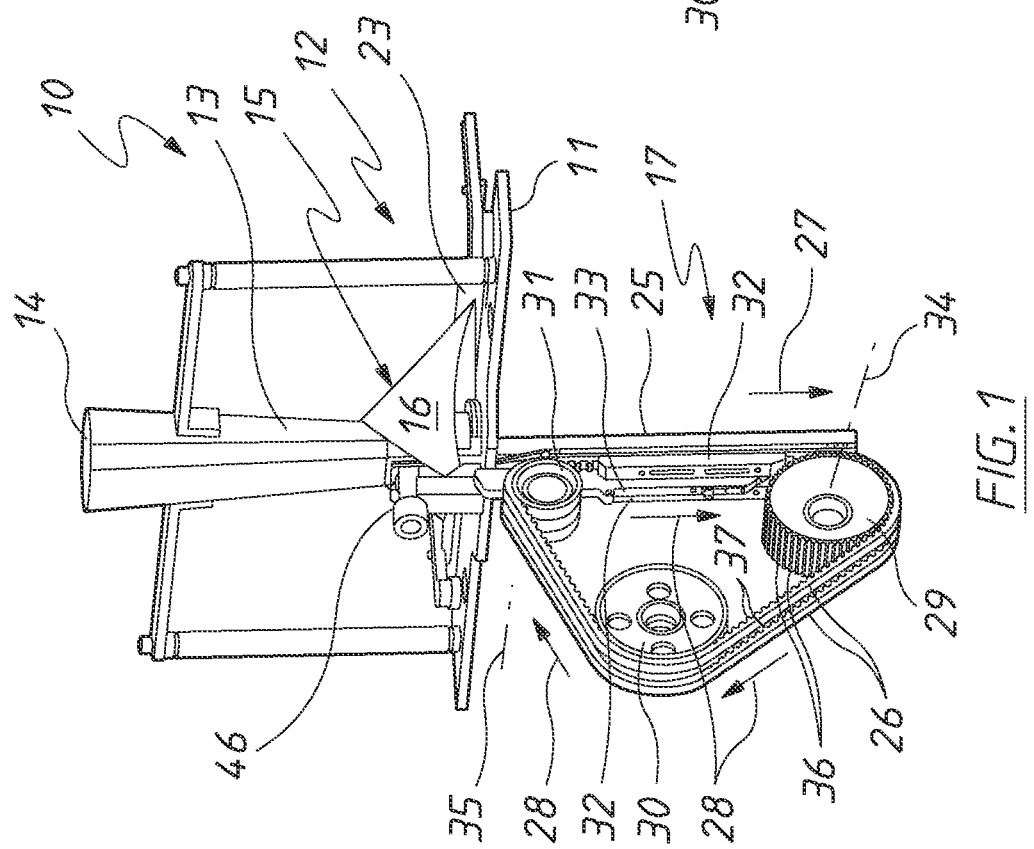
FIG. 1
FIG. 2

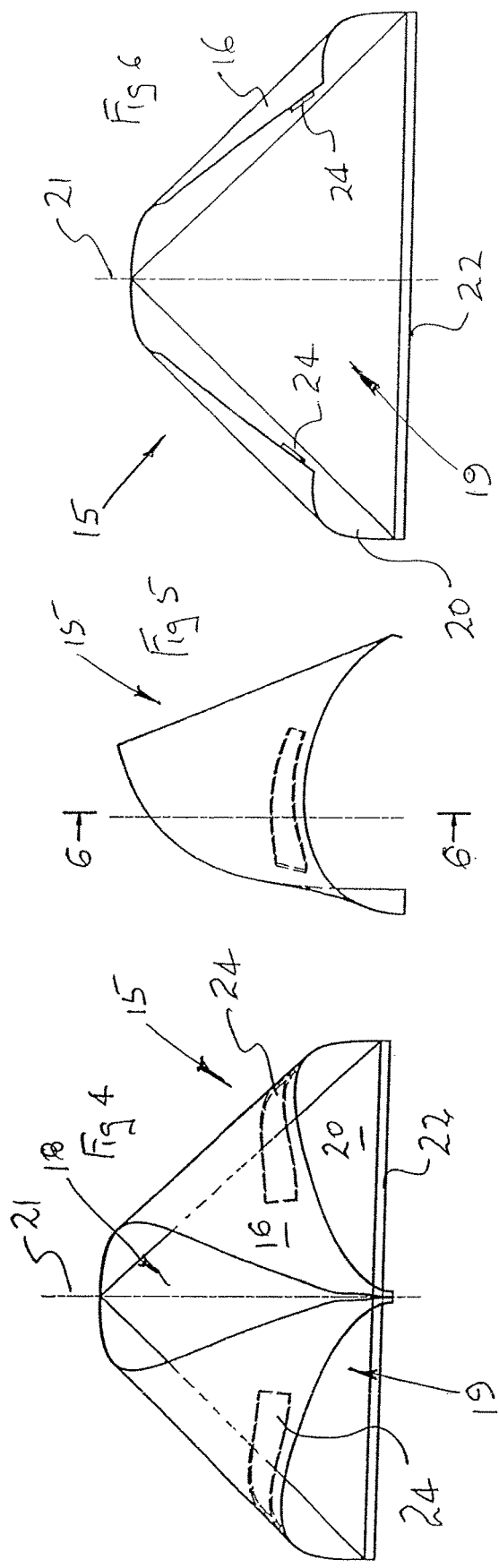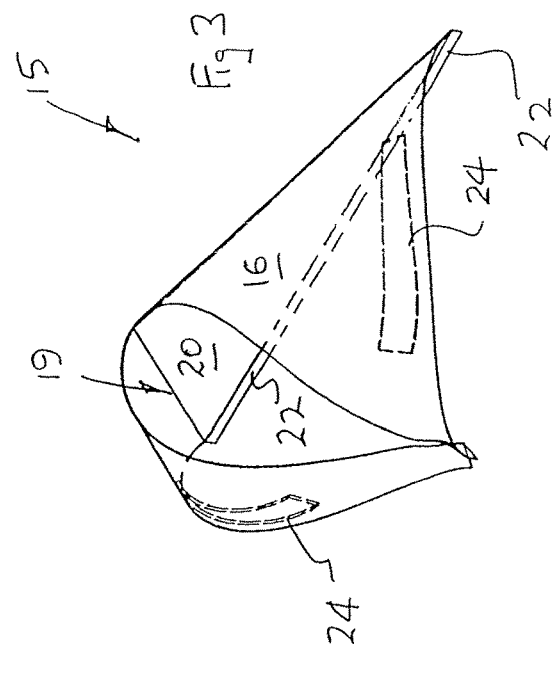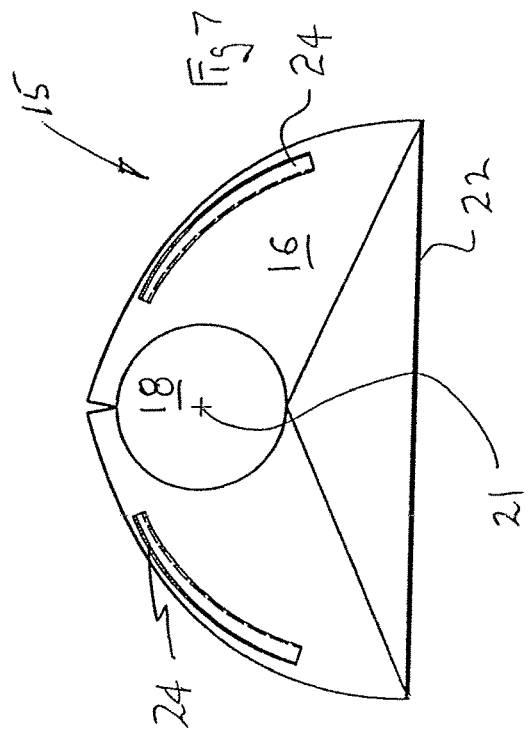

FORMER SHOULDER

This application claims priority to Australian Patent Application No. 2011905057 filed Dec. 5, 2011, the disclosure of which is incorporated by reference herein.

FIELD

The present invention relates to former shoulders employed in the packaging industry to deliver tubular bag material to packaging machines which form bags of product.

BACKGROUND

Packaging machines receive bag material in tubular form. Product to be packaged is delivered to the interior of the tubular bag material, with the packaging machine then transversely sealing and cutting the tubular bag material to form bags of product. The tubular bag material is formed by a former shoulder, to which packaging film is delivered in strip form. Formers and packaging machines are described in U.S. Pat. Nos. 4,910,943, 5,622,032, 4,663,917, 6,655,110, 7,159,376, 7,600,630, 7,383,672, 4,753,336, 7,124,559, 7,415,809, 7,152,387 and 7,472,528.

The tubular material provided by the former shoulder is longitudinally sealed. This function is performed by heating the tubular bag material along its longitudinally overlapping edges and by applying pressure to the overlapping longitudinal edges.

In order to successfully form the longitudinal seal, the tubular bag material must be heated to a required temperature so that upon pressure being applied the plastic material fuses to form the seal. The temperature of the tubular bag material is raised to the required temperature by the bag material passing a heated backing bar or heating bar.

A disadvantage of the above described apparatus and method is that the backing bar and/or heater has considerable length as it takes time for sufficient heat to be transferred to the tubular bag material. This in turn has the disadvantage of increasing the height of the machinery and the length of the tubular bag material between the former shoulder and packaging machine.

OBJECT

It is the object of the present invention to overcome or substantially ameliorate at least one of the above disadvantages.

SUMMARY

There is disclosed herein a former shoulder for a packaging machine, the former shoulder being configured to receive a strip of film bag material to configure the bag material into a tubular configuration, the shoulder including:

an external former surface over which the bag material is to pass to be configured into the tubular configuration, with the external surface surrounding an aperture via which product is delivered into the tubular bag material;

an internal surface surrounding a cavity communicating with said aperture; and a heater to heat the external surface to in turn heat bag material passing over the external surface.

Preferably, the heater is fixed to the surfaces.

Preferably, the heater includes a first heater and a second heater, the heaters being located so that the aperture is located therebetween.

Preferably, each heater is fixed to the internal surface.

Preferably, each heater is an electrical resistance heater to which electrical energy is delivered to cause the heater to heat the external surface.

Preferably, the shoulder has an upright longitudinal axis, and each heater has a longitudinal length and a transverse width, with the longitudinal length being greater than the transverse width, and with each heater extending longitudinally angularly about said axis.

Preferably, each heater is located so as to be positioned adjacent a portion of the external surface over which longitudinal edges of the tubular bag material are to pass.

BRIEF DESCRIPTION OF THE DRAWINGS

A preferred form of the present invention will now be described by way of example with reference to the accompanying drawings wherein:

FIG. 1 is a schematic isometric view of a former assembly and a drive to engage tubular bag material to pull the bag material past the former assembly;

FIG. 2 is schematic side elevation of the former assembly and drive of FIG. 1;

FIG. 3 is a schematic isometric view of a former shoulder of the former assembly of FIGS. 1 and 2;

FIG. 4 is a schematic front elevation of the former shoulder of FIG. 3;

FIG. 5 is a schematic side elevation of the former shoulder of FIG. 3;

FIG. 6 is a schematic sectioned front elevation of the former shoulder as shown in FIG. 5 sectioned along the line 6-6; and FIG. 7 is a schematic top plan view of the former shoulder of FIG. 3.

DETAILED DESCRIPTION OF THE PREFERRED EMBODIMENTS

In the accompanying drawings there is schematically depicted a former assembly 10. The former assembly 10 may be similar to the former assemblies as disclosed in U.S. Pat. Nos. 712,459 and 7,415,809.

The former assembly 10 includes a base 11 to which there is attached a frame 12 that supports a sleeve 13. The sleeve 13 encloses a generally upwardly extending passage 14 to which product is delivered in batches from a weighing machine such as that disclosed in U.S. Pat. No. 7,600,630 and European Patent Application 082909573. The sleeve 13 passes through a former shoulder 15 having an external former surface 16 to which strip film material is delivered to be formed into a tubular configuration. Product is delivered to the passage 14 to be delivered to the interior of the tubular bag material 45. A packaging machine, such as that disclosed in U.S. Pat. No. 4,753,336, positioned below the drive assembly 17 transversely seals and cuts the bag material to form bags of product.

The former assembly 10 may include ducting 46 to deliver an inert gas to the interior of the tubular bag material 45.

The former shoulder 15 is more fully depicted in FIGS. 3 to 7. The shoulder 15 of this embodiment has the external surface 16 surrounding a generally central circular aperture 18 via which product is delivered to the interior of the tubular bag material 45. The sleeve 13 passes through the aperture 18 so as to project through the internal cavity 19 of the shoulder 15. The cavity 19 is surrounded by the internal surface 20 of the shoulder 15.

In the above described preferred embodiment, the aperture 18 is generally circular. However in other embodiments, the aperture 18 may be generally square or rectangular, depending on the configuration of the bag being formed.

The shoulder 15 is formed from a sheet of stainless steel bent around a generally central upright longitudinal axis 21, with the sheet terminating at a folded rear edge 22. The rear edge 22 is secured to a transverse member 23 of the frame 12. The axis 21 is the central axis of the aperture 18.

Fixed to the internal surface 20 are heaters 24 that heat the external surface 16 over which the film bag material passes so as to be heated. The heaters 24 are located on opposite sides of the aperture 18, in particular the aperture 18 and axis 21 are located between the heaters 24. More particularly the heaters 24 are symmetrically or asymmetrically arranged on opposite sides of the axis 21 and extend angularly about the axis 21. Each heater has a transverse width and a longitudinal length greater than the width. Each heater 24 extends longitudinally angularly about the axis 21.

Heating of the tubular bag material 45 as it passes the former shoulder 15 has the advantage of reducing the length of the tubular bag material 45 that needs to be heated by the drive assembly 17. Accordingly the drive assembly 17 can be reduced in height.

The heaters 24 may be electrical resistance heaters, that is the heaters 24 have an electrical resistance so that upon electric power being applied thereto, they are raised in temperature, therefore raising the temperature of the surface 16.

The film bag material passing over the surface 16 is formed into a tubular form with overlapping longitudinal edges. The heaters 24 are located so as to heat the longitudinal edges of the bag material.

Fixed to so as to be supported by the frame 12 is a backing bar 25. The backing bar 25 is located internally of the tubular bag material 45 so that the tubular bag material 45 is located between the backing bar 25 and the drive belts 26. The backing bar 25 may include a heater so that the overlapping longitudinally extending edge portions of the tubular bag material 45 are heated thereby.

The belts 26 engage the tubular bag material 45 and cause the tubular bag material 45 to pass downwardly in the direction 27 past the former shoulder 15 for delivery to a packaging machine below the assembly 17. The packaging machine may be a packaging machine as disclosed in U.S. Pat. No. 4,753,336.

The belts 26 are driven in the direction 28 by means of a drive pulley 29. The pulley 29 would be connected via shaft to a drive motor. The belts 26 pass about idler pulleys 30 and 31, with the belts 26 passing between the pulleys 29 and 30 along a linear path parallel to the backing bar 25 and axis 21.

Located adjacent the backing bar 25 are vacuum manifolds 32 to which a vacuum is applied. The belts 26 have apertures (not illustrated) that communicate with the vacuum chambers provided by the manifolds 32, with the reduced air pressure being applied to one side of the tubular bag material 45 to urge the tubular bag material 45 into contact with the drive surfaces of the belts 36. The vacuum drive assemblies are shown in U.S. Pat. Nos. 7,124,559 and 4,910,943.

Located between the manifolds 32 is a heating bar 33 that is electrically heated to again aid in raising the temperature of the tubular bag material 45 so that pressures applied to the tubular bag material 45 by the bar 33 and backing bar 25 will cause the longitudinal edge portions of the tubular bag material 45 to be fused so as to be sealingly connected. The bar 33 is urged toward the bar 25 by springs not illustrated.

To drive the belts 26, the pulley 29 is provided with a plurality of drive teeth 36 that engage teeth 37 on the drive surface of the belts 26.

An advantage of the above described drive assembly 10 is that the distance between the rotational axes 34 and 35 of the pulleys 29 and 31 is reduced relative to previous machines as it is no longer necessary for the tubular bag material 45 to be heated over an extended length. To provide for this reduced distance between the axes 34 and 35 the further idler pulley 30 is required.

The above described preferred embodiments of the present invention provide the advantage of reducing the overall length of the tubular bag material 45 between the aperture 18 and the packaging machine. It has been found that by reducing this length the product being packaged is maintained in batches having a shorter longitudinal length (a length parallel to the axis 21).

The invention claimed is:

1. A former shoulder for a packaging machine, the former shoulder being configured to receive a strip of film bag material and to configure the strip of film bag material into tubular bag material, the former shoulder having a generally upright central axis and comprising:
   an external surface over which the strip of film bag material is to pass upwardly to be configured into the tubular bag material, the external surface extending upwardly and surrounding an aperture through which the axis passes with the aperture configured for product to be delivered through the aperture, the external surface facing outwardly away from the central axis;
   an internal surface inclined relative to said axis so as to extend upwardly and toward said axis, and surrounding and in direct communication with a cavity through which the tubular bag material passes, the internal surface facing inwardly toward the central axis; and
   a heater fixed to the internal surface and positioned to heat the outwardly facing external surface to in turn heat the strip of film bag material passing over the outwardly facing external surface prior to being configured into tubular bag material.

2. The former shoulder of claim 1, wherein the heater includes a first heater and a second heater, the heaters being located so that the aperture is located therebetween.

3. The former shoulder of claim 2, wherein each heater is fixed to the internal surface.

4. The former shoulder of claim 3, wherein each heater is an electrical resistance heater to which electrical energy is delivered to cause the heater to heat the external surface.

5. The former shoulder of claim 3, wherein each heater has a longitudinal length and a transverse width, with the longitudinal length being greater than the transverse width, and with each heater extending longitudinally angularly about said axis.

6. The former shoulder of claim 3, wherein each heater is adjacent a portion of the external surface over which longitudinal edges of the tubular bag material are to pass.

7. The former shoulder of claim 2, wherein each heater is an electrical resistance heater to which electrical energy is delivered to cause the heater to heat the external surface.

8. The former shoulder of claim 2, wherein each heater has a longitudinal length and a transverse width, with the longitudinal length being greater than the transverse width, and with each heater extending longitudinally angularly about said axis.

9. The former shoulder of claim 2, wherein each heater is adjacent a portion of the external surface over which longitudinal edges of the tubular bag material are to pass.

10. The former shoulder of claim 1, wherein the heater is an electrical resistance heater to which electrical energy is delivered to cause the heater to heat the external surface.

11. The former shoulder of claim 10, wherein the heater has a longitudinal length and a transverse width, with the longitudinal length being greater than the transverse width, and with the heater extending longitudinally angularly about said axis.

12. The former shoulder of claim 10, wherein the heater is adjacent a portion of the external surface over which longitudinal edges of the strip of film bag material are to pass.

13. The former shoulder of claim 1, wherein the heater has a longitudinal length and a transverse width, with the longitudinal length being greater than the transverse width, and with the heater extending longitudinally angularly about said axis.

14. The former shoulder of claim 13, wherein the heater is adjacent a portion of the external surface over which longitudinal edges of the strip of film bag material are to pass.

15. The former shoulder of claim 1, wherein the heater is adjacent a portion of the external surface over which longitudinal edges of the tubular bag material are to pass.

\* \* \* \* \*